April 19, 1966 W. F. LANG ETAL 3,246,364
MACHINE FOR MAKING MOLDED BODIES FROM PLASTIC MATERIAL
Filed Dec. 31, 1963 12 Sheets-Sheet 1

INVENTORS
WILLIAM F. LANG
DONALD F. SPENGLER
BY
Kenyon & Kenyon
ATTORNEYS

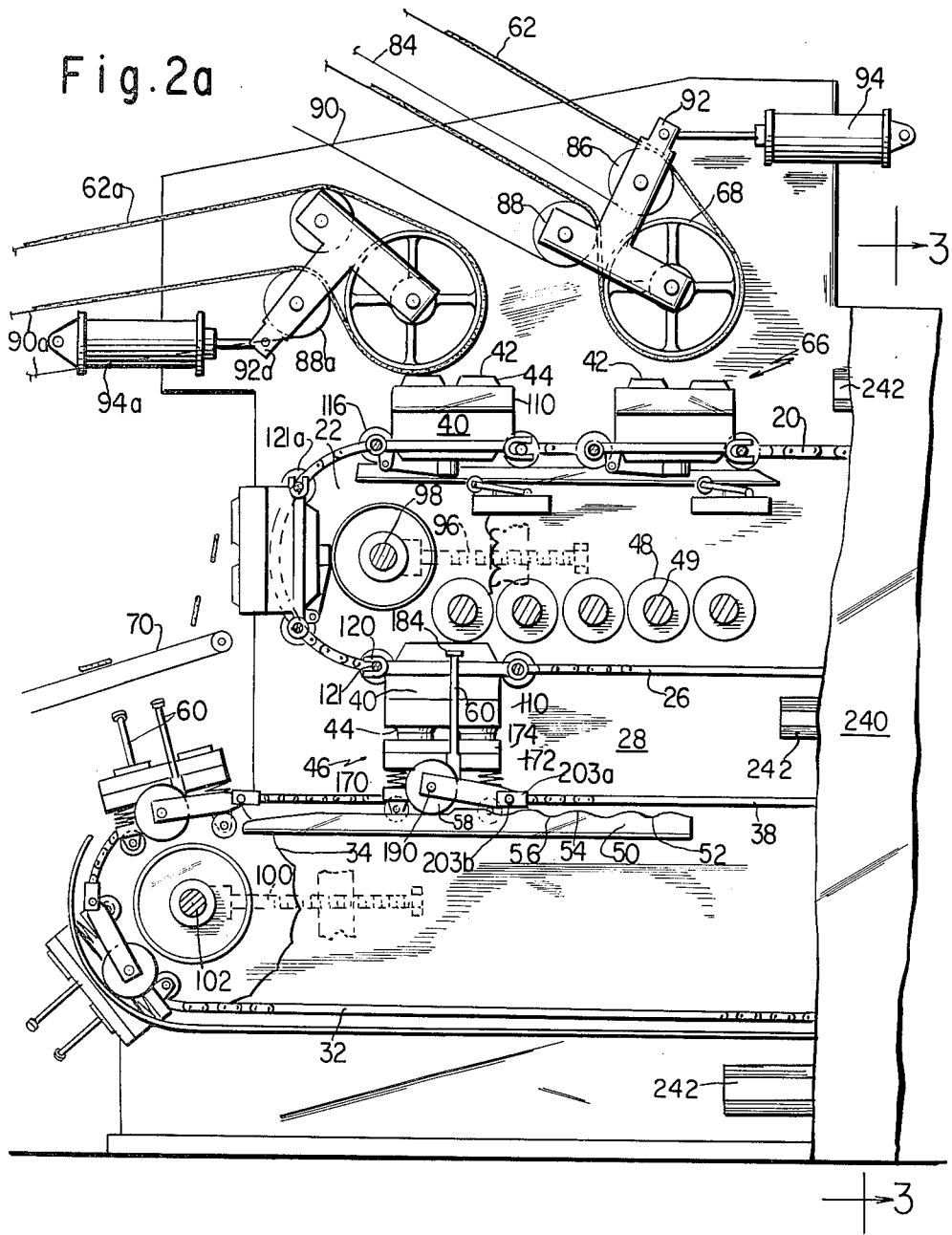

April 19, 1966     W. F. LANG ETAL     3,246,364
MACHINE FOR MAKING MOLDED BODIES FROM PLASTIC MATERIAL
Filed Dec. 31, 1963     12 Sheets-Sheet 3

INVENTORS
WILLIAM F. LANG
DONALD F. SPENGLER
BY
ATTORNEYS

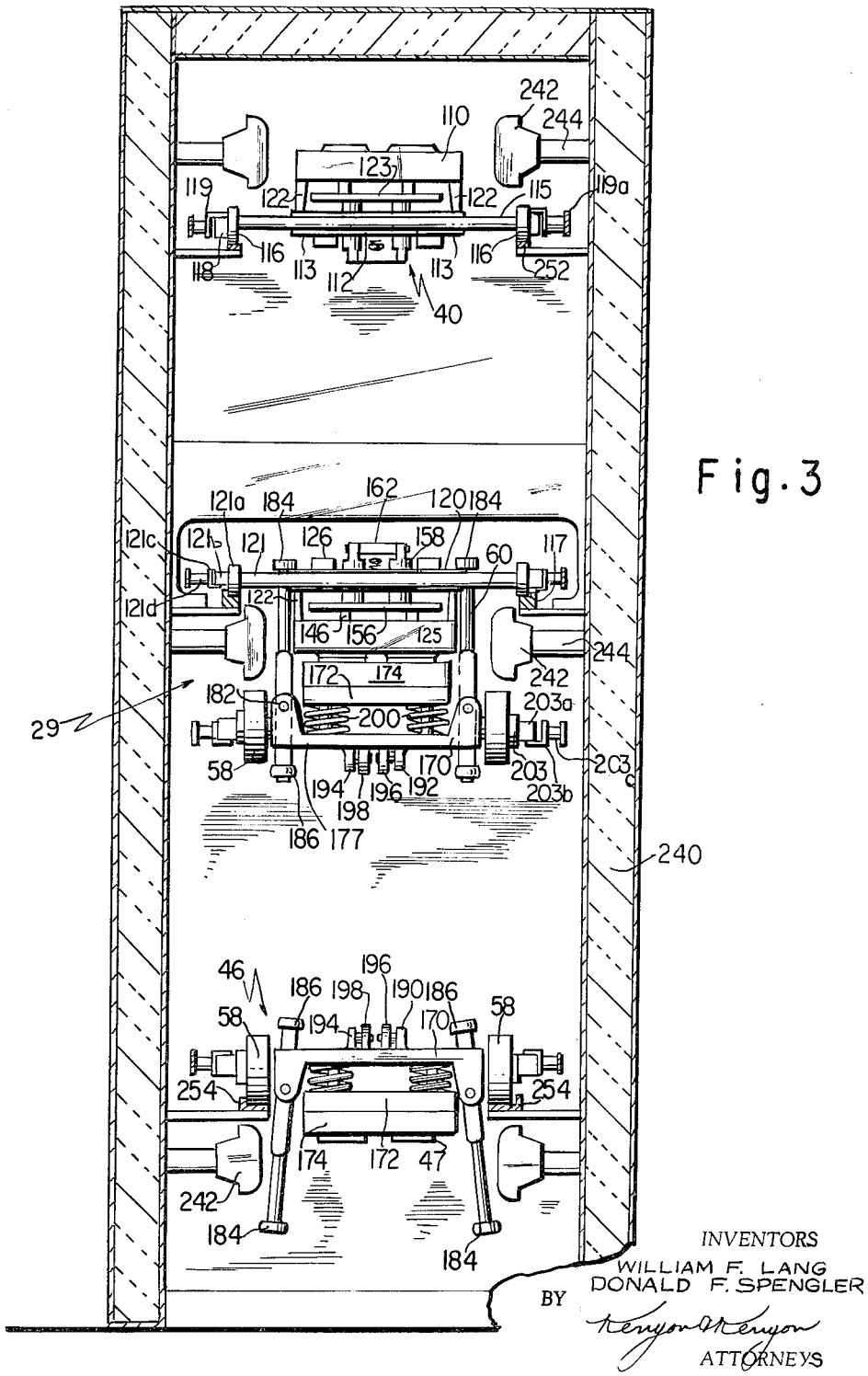

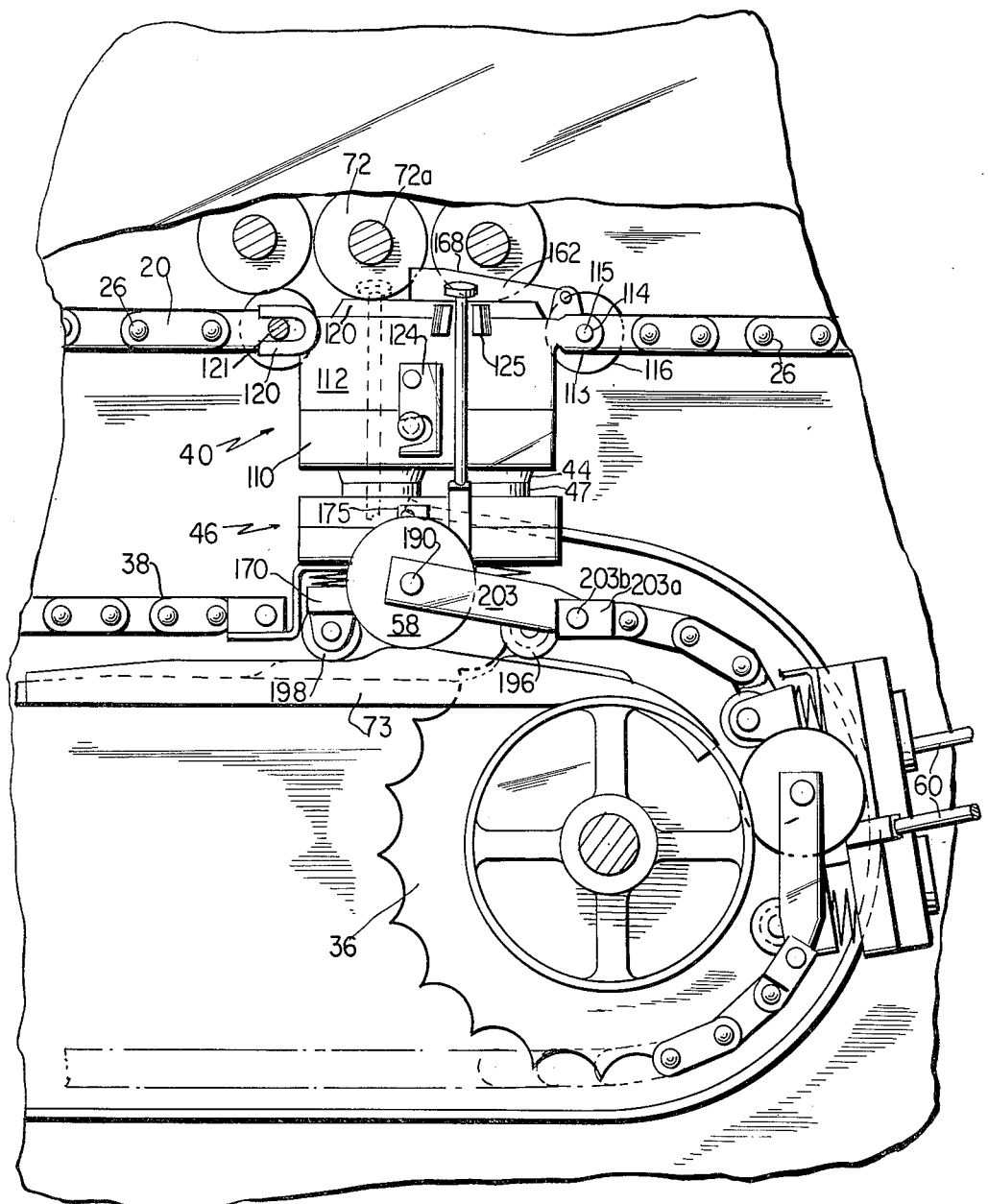

INVENTORS
WILLIAM F. LANG
DONALD F. SPENGLER
BY
ATTORNEYS

INVENTORS
WILLIAM F. LANG
DONALD F. SPENGLER
BY
ATTORNEYS

April 19, 1966 W. F. LANG ETAL 3,246,364
MACHINE FOR MAKING MOLDED BODIES FROM PLASTIC MATERIAL
Filed Dec. 31, 1963 12 Sheets-Sheet 12

INVENTORS
WILLIAM F. LANG
DONALD F. SPENGLER
BY
Kenyon & Kenyon
ATTORNEYS

United States Patent Office 3,246,364
Patented Apr. 19, 1966

3,246,364
MACHINE FOR MAKING MOLDED BODIES FROM
PLASTIC MATERIAL
William F. Lang, 85 Pocahontas Drive, Warwick, R.I.,
and Donald F. Spengler, 100 River Road, Stratford,
Conn.
Filed Dec. 31, 1963, Ser. No. 334,737
11 Claims. (Cl. 18—4)

This invention relates to machines for making molded bodies and more particularly to machines for making molded bodies from a coherent mass of plastic material.

Molded plastic articles, i.e., molded articles prepared from various plastic materials such as rubber and synthetic resins, are frequently prepared by batch processes according to the technique commonly referred to as "compression molding." In compression molding, the plastic mix is initially prepared in any suitable way. For example, when rubber is the plastic material, rubber is mixed with filler material such as carbon black, clay and the like, and curatives such as sulfur, zinc oxide, and the like. This usually is done in a Banbury mixer or a two-roll rubber mill, or a combination of both. After the unvulcanized rubber mix has been prepared, it is worked on a warm-up mill and fed to an extruder and is extruded in rod form. Extruded rod material either immediately or after storage is next taken to a cut-off machine which cuts off from the rod material slugs or pre-forms of suitable size for introduction, respectively, into mold cavities having the contours of the particular body to be produced for compression therein utilizing both a mold and a hydraulic press. The slugs or pre-forms are individually introduced by an operator into the mold cavities and the mold is placed between the press platens wherein the slugs are compressed and likewise are subjected to heat and pressure for a sufficient length of time to vulcanize or otherwise cure the rubber composition. The heat for vulcanizing or other curing is generally provided by the use of steam heated platens.

After curing, the press is opened, the mold removed from between the press platens, and the molded and cured bodies are removed. To facilitate such removal it is current practice to introduce sufficient rubber in the slug or pre-form state so as to more than fill the mold cavities, with the result that the rubber overflows the mold cavities and provides a connecting web between the platens whereby the molded bodies are joined by the connecting web material so that all of the molded bodies may be removed from the press while joined together in a sheet-like body in a single operation. The die platens used in hydraulic presses of the type most commonly used range from about 20 inches up to about 48 inches square and the number of individual mold cavities per platen usually is of the order of 50 to 200.

After removal of the molded bodies joined together in sheet form from the press, it is necessary to remove the web material which joins the molded bodies. Two expedients have been resorted to for this purpose. One of these expedients is to remove the web material, or "flash," with specially shaped die knives, which usually are referred to as "dinkers." The other expedient, especially suitable for thin webs, is that of tumbling the bodies with the web material still attached thereto in a tumbling machine which is sometimes loaded with Dry Ice. The Dry Ice renders the rubber very brittle and since the flash presents a thin section it breaks off from the molded body and may be separated in this way.

Batch operations in hydraulic presses require a large amount of manual labor. A further disadvantage is the low rate of production in relation to the equipment cost and amount of space required.

A substantial step forward in the production of molded articles by compression molding was made in the invention of a machine for making such articles on a continuous basis, as described in United States Patent No. 2,958,095 issued November 1, 1960. The production of articles on a continuous basis greatly reduces the amount of labor necessary as compared to older batch methods. The machine in said patent provides for successively introducing uncured plastic material into molds from a continuously supplied sheet of the plastic material returning for reuse the material not blanked from the sheet, closing the molds, heat treating the material in the molds to vulcanize or cure the same by passing the molds through a heating zone, opening the molds, and discharging the vulcanized or cured plastic article. This is accomplished in said patent by providing an endless traveling chain conveyor having a plurality of mold presenting units, each having one or more mold cavities therein. This chain conveyor has a linear reach of substantial length through the mold closing, heating and mold opening zones. Closure of the mold according to said patent is accomplished by means of mold closing units traveling on a second endless chain conveyor, the two conveyors having opposed linear reaches of substantial length wherein a mold presenting unit and an opposed mold closing unit move along together in synchronous relationship, the mold closing unit closing the mold cavity in the mold carriage unit. The mold closing unit is maintained in mold closing relationship through the heating zone by means of heavy compression tracks. Untreated plastic material which has been mixed and compounded by conventional apparatus which includes a mill is formed into a plastic sheet, and is blanked from this sheet and introduced into the mold cavities on a blanking wheel.

An object of this invention is to provide an improved machine for making molded plastic articles from a workable mass of plastic material.

Another object of this invention is to provide a continuous molding machine having a plurality of mold presenting units and a plurality of mold closing units, in which said units are held together in mold closing relationship during heating and vulcanization by an improved mechanism which does not require heavy compression tracks.

A further object of this invention is to provide a molding machine of the character described in which the molds are automatically opened momentarily shortly after closure thereof to permit discharge of air therefrom, said result being accomplished by means comprising a track having undulations or bumps.

A further object of this invention is to provide a machine which is versatile in its operations, permitting the simultaneous production of two or more different types of articles.

A further object of this invention is to provide a machine which can be used for the making of composite molded articles, i.e. articles containing two or more different rubber or plastic stocks.

A further object according to a specific embodiment of this invention is to provide a continuous machine of the character described whereby plastic material may be blanked into an annular or other continuous trough-shaped mold cavity while conserving for reuse plastic material blanked into the area surrounded by the mold cavity.

A further object according to a feature of preferred practice of this invention is to bring mold presenting units and mold closing units into opposed relation along opposed linear reaches of continuous carriers that are disposed in substantially offset relation.

FIG. 2a is a side elevation of the feed end of the machine in FIG. 1;

FIG. 2b is a side elevation of the discharge end of the machine in FIG. 1, FIG. 2b being a continuation of FIG. 2a;

FIG. 3 is a sectional elevation on a larger scale taken along the line 3—3 of FIG. 2a;

FIG. 4 is a side elevation of the discharge end of the machine, illustrating a portion of the apparatus shown in FIG. 2b on a larger scale;

Figure 1:
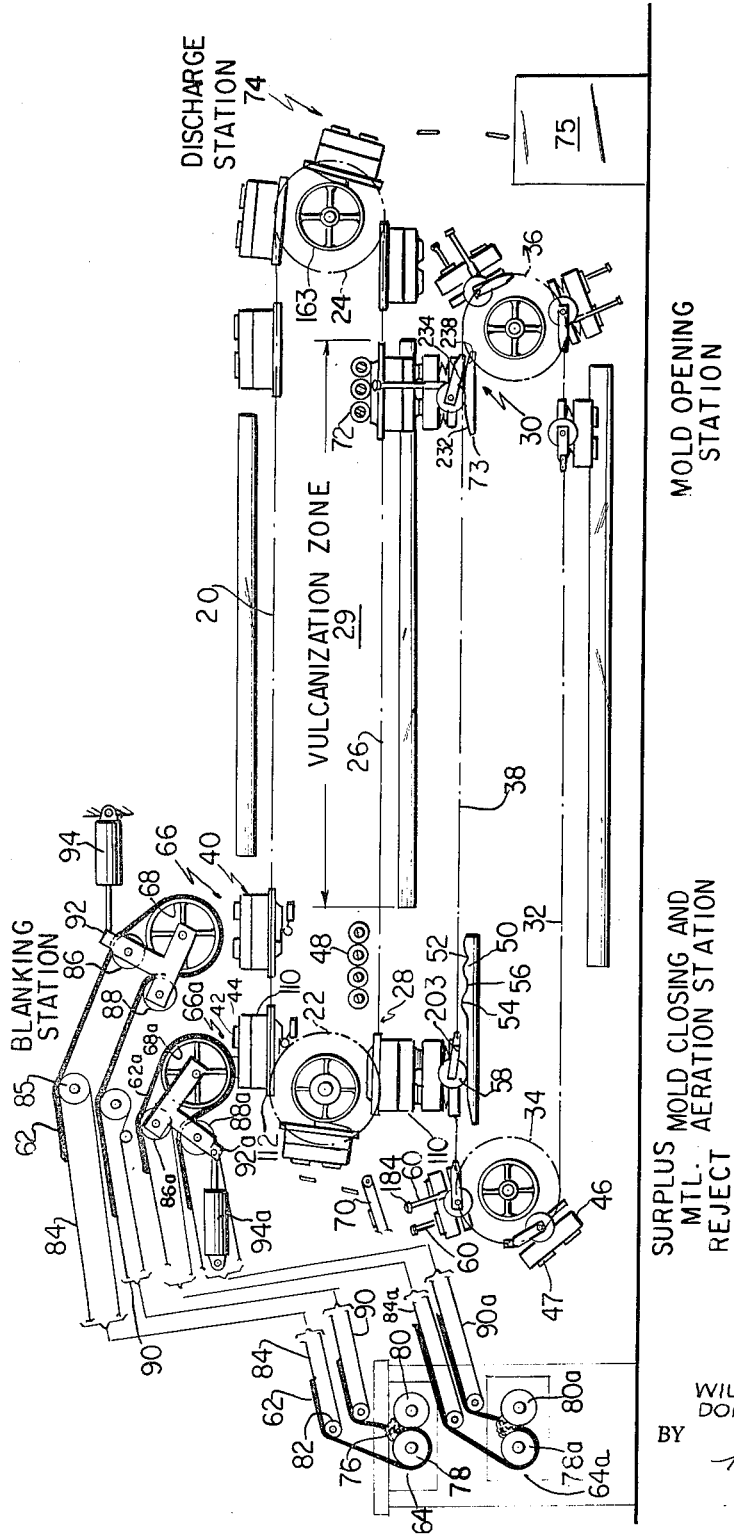
FIG. 1 is a schematic side elevation of a machine embodying this invention.

Referring now to the drawings and especially FIG. 1 thereof, the machine of the present invention comprises a first endless carrier 20 which is preferably in the form of an endless chain conveyor and which travels over sprockets 22 and 24. Carrier 20 has at least one elongated linear reach 26 which lies on the lower side thereof between sprockets 22 and 24, and which extends from a mold closing zone 28 adjacent sprocket 22 through a vulcanizing zone 29 to a mold opening zone 30 adjacent sprocket 24. The machine also includes a second endless carrier 32, which is also preferably in the form of a chain conveyor traveling over sprockets 34 and 36, and including therebetween on the upper side thereof an elongated linear reach 38. Carrier 32 is situated below carrier 20 on that elongated linear reach of carrier 20 lies above elongated linear reach 38 and carrier 32. Linear reaches 26 and 38 are preferably of approximately the same length but in offset relation to each other, so that the end of the linear reach 26 extends beyond the end of the linear reach 38 and the beginning of reach 38 precedes the beginning of reach 26 by approximately the same distance. The two carriers 20 and 32 are driven at the same speed. This can be accomplished by driving one of the sprockets in each carrier, as for example sprockets 24 and 36, from a common driving source. The two carriers are driven in the same direction along the opposed linear reaches 26 and 38, the respective carriers traveling from left to right as seen in FIG. 1. In other words, carrier 20 travels counter-clockwise and carrier 32 travels clockwise.

A succession of mold presenting units 40 is secured to carrier 20 for travel therewith. Although for simplicity only a few representative mold presenting units are shown, the carrier 20 actually comprises a succession of mold presenting units 40 along its entire length, each mold presenting unit being separated from the adjacent mold presenting unit on either side by only a small distance.

Figure 7:
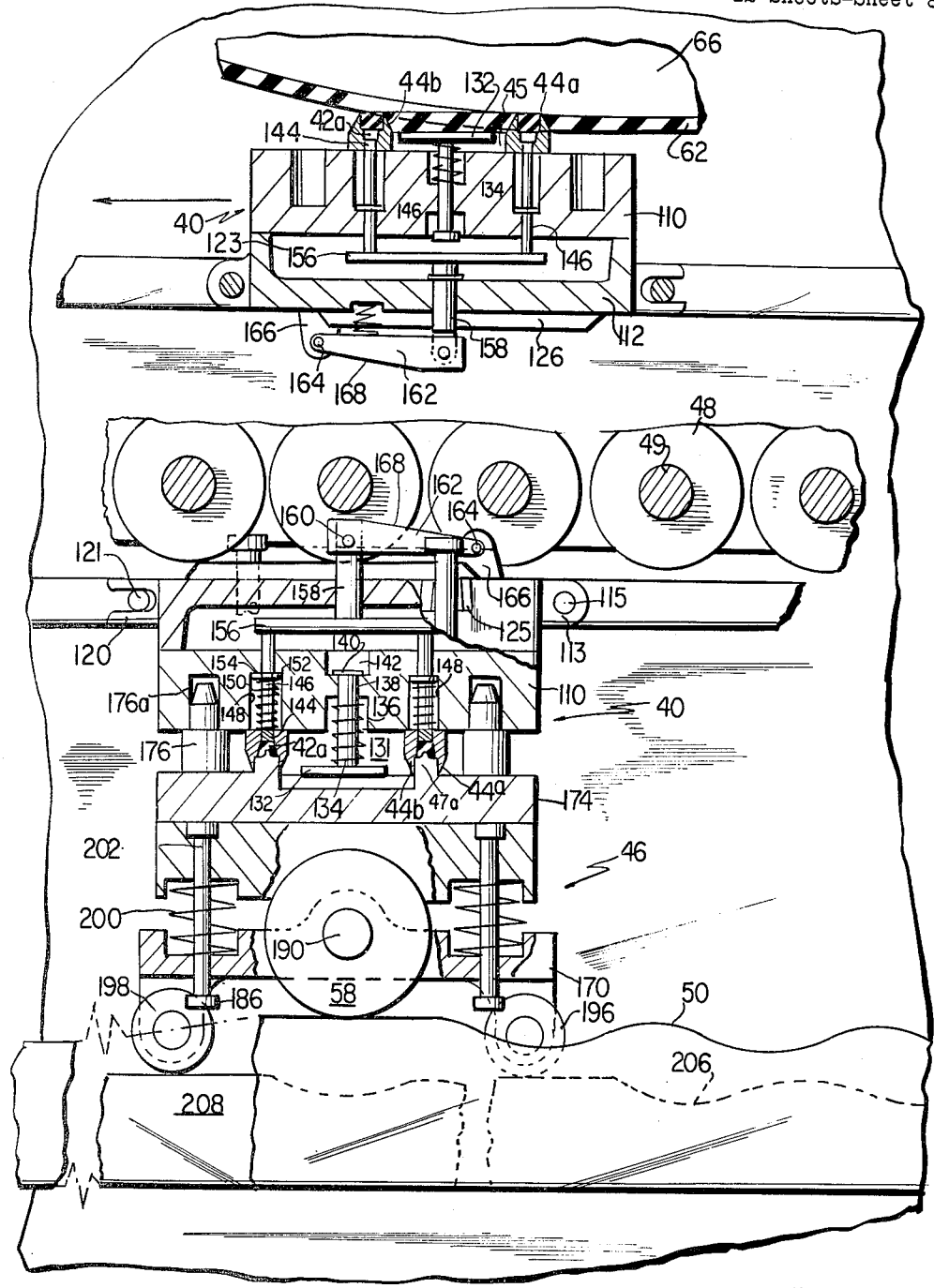
FIG. 7 is a side elevation, partly in section, of the mold presenting and mold closing units, according to a modified form of the invention.
Figure 8:
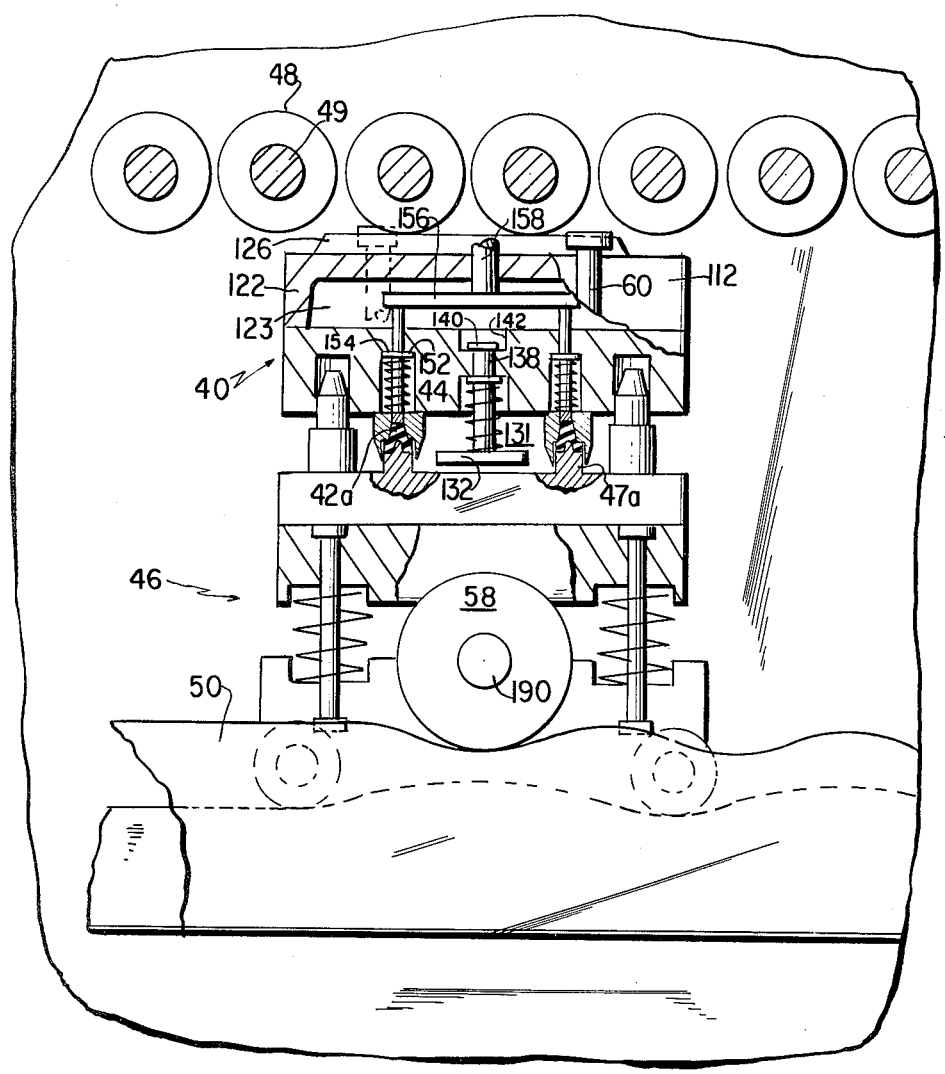
FIG. 8 is a side elevation, partly in section, similar to the view of FIG. 7 but showing the parts in another position.

In the embodiment shown in FIGS. 1 through 6 inclusive, each mold presenting unit contains four mold cavities 42 arranged in two rows of two mold cavities each. FIGS. 7 and 8 illustrate a modified form of the invention, particularly adapted for the manufacture of annular articles such as O-rings and washers, wherein each mold cavity is in the form of a continuous trough which has a protruding blanking edge on each side thereof and which surrounds a material receiving recess 131. This embodiment also includes means for rejecting the surplus plastic material which is blanked from the continuous plastic sheet and introduced into this material receiving recess, said reject means being located between the blanking means and the mold closing zone. In those figures as well as in FIGS. 11, 12, and 13 only a single mold cavity is shown for each mold presenting unit so that the structure may be shown more clearly. However, in ordinary practice a plurality of mold cavities is comprised in each mold presenting unit.

In the embodiments of the present invention, shown in FIGS. 1 to 6 and 11 to 13, each mold cavity 42 is surrounded by a protruding blanking edge 44 which has a sharp edge adapted to cut the plastic sheet and thereby blank plastic material therefrom. The embodiment of FIGS. 7 and 8 differs from the other embodiments in that this embodiment is particularly adapted for the manufacture of annular articles such as O-rings, and each cavity is characterized by two separate protruding blanking edges 44a and 44b, the former being located along the outer periphery of the mold cavity 42a and adapted to cut a sheet of plastic material and thereby blank said plastic material into said mold cavity, and the latter being an inner protruding blanking edge which separates the annular mold cavity 42 from the material receiving recess 131.

A second carrier 32 has a succession of mold closing units 46 spaced close together along its entire length and secured for travel with the carrier. Each of these mold closing units 46 has a mold closing member 47 adapted to co-act with each mold cavity 42, respectively, when held thereagainst and thereby close the same when reaches 26 and 38 are in opposed relation.

Figure 6:
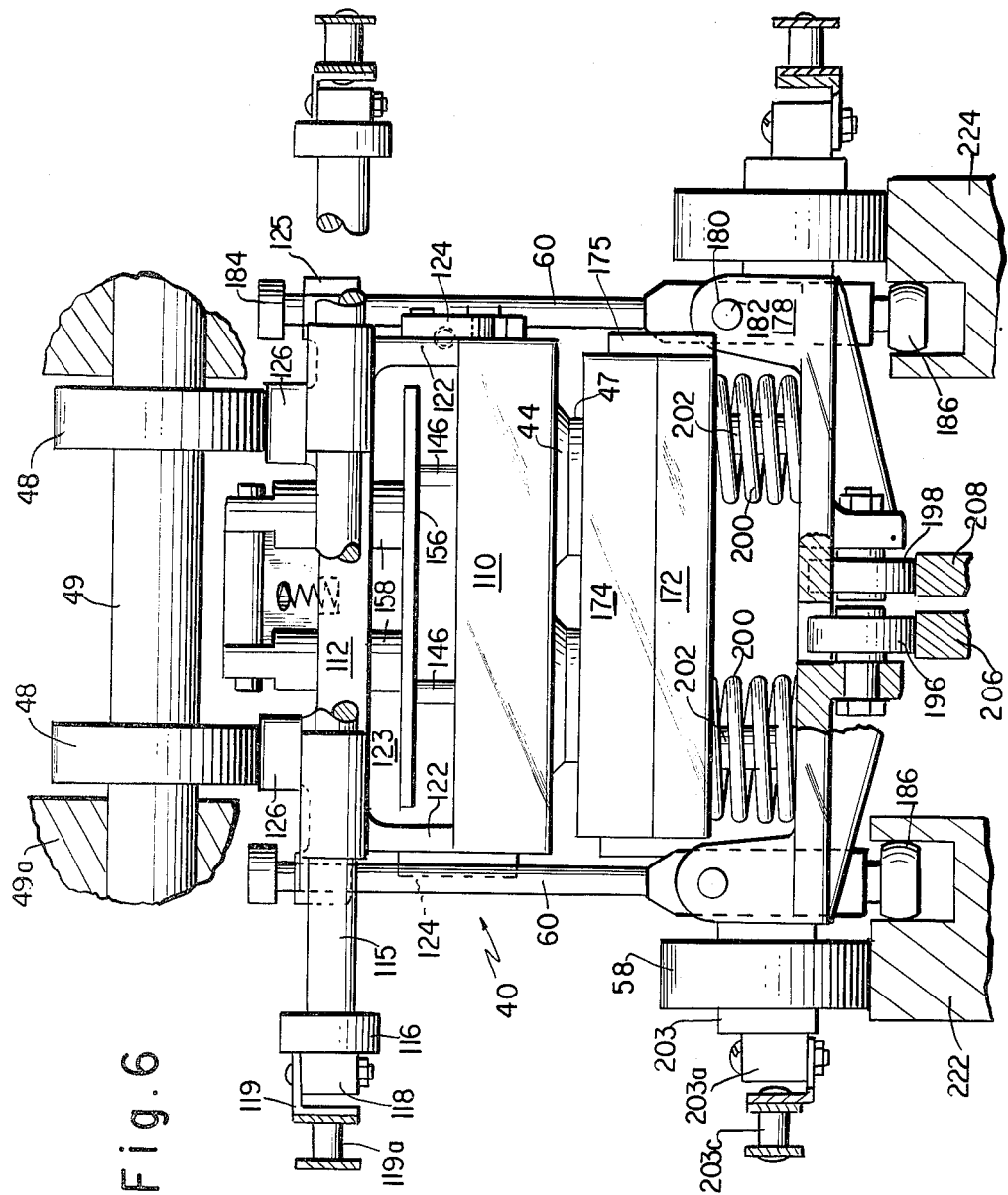
FIG. 6 is an end elevation, as seen from the front, of units shown in FIG. 5.

Rollers 48 having axles 49 journaled in axle housings 49a (as shown in FIG. 6) and compression track 50 directly below rollers 48 at mold closing zone 28 co-act to press mold closing units 46 resiliently against mold presenting units 40 in mold closing relationship, and constitute the first pressure applying means for pressing the mold closing units against the mold presenting units.

Rollers 48 are located directly above compression track 50, the roller farthest forward being directly over the forward edge of compression track 50, and the roller 48 farthest back being substantially directly over the back end of compression track 50. Compression track 50 provides means adjacent mold closing zone 28 for reopening each mold cavity at least once sufficiently to permit the escape of any gas entrapped therein and for then reclosing said mold cavity with the opposed mold closing unit 46. Track 50 has an undulating surface 52 comprising at least one and preferably a plurality of peaks 54 and valleys 56.

Each of the mold closing units 46 is provided with roller means 58, herein illustrated as a pair of wheels on the sides of said mold closing body. Wheels 58 ride on compression track 50 so as to coact with the undulating surface 52 thereof during travel of said mold closing bodies and thereby reopen the mold cavities 42 during the travel of the roller means 58 through a valley in the undulating surface and then promptly reclose the mold cavity when the roller approaches the trailing edge of a valley 56 on its ascent to the next peak 54.

Figure 9:
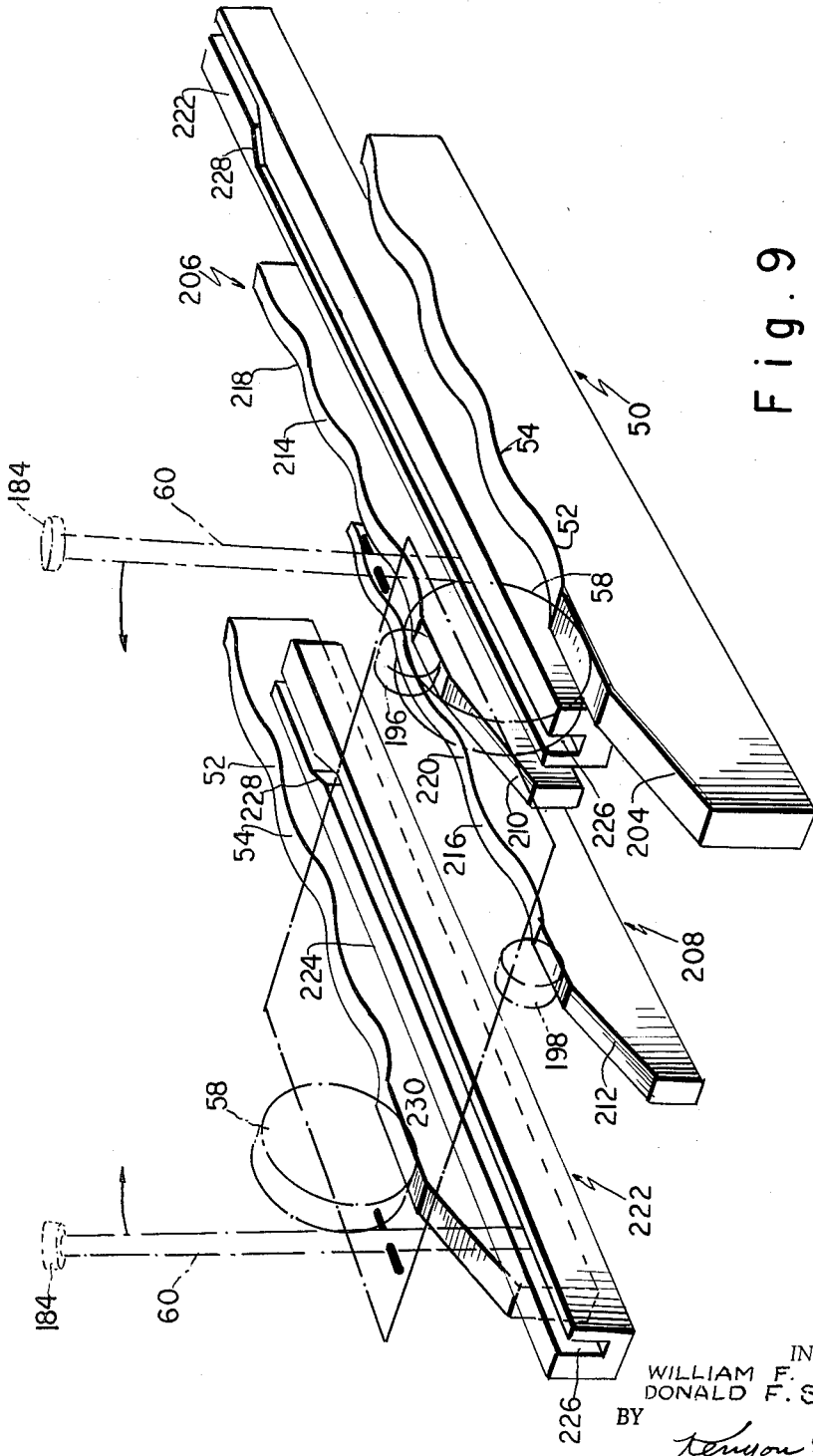
FIG. 9 is an isometric and partly schematic view of the guide tracks and cam operating means at the mold closing.

Latch means 60 in the form of a pair of latches secured to each mold closing unit 46 are provided for securing said mold presenting units 40 to said mold closing units 46 when said units are in opposed relation during travel along reaches 26 and 33. Means to be described in further detail later with respect to FIG. 9 are provided adjacent the mold closing zone to actuate said latch means 60 into position wherein the mold presenting units 40 and mold closing units 46 are held secured together in mold closing relationship in response to the travel of said units. Means are also provided adjacent the mold opening zone 30 for releasing said latch means 60 responsive to the travel of units 40 and 46 so that the molds can be opened. During the travel of the mold presenting units 40 and mold closing units 46 from the mold closing zone 28 through vulcanizing zone 29 to the mold opening zone 30, said units and the plastic material contained in the mold cavities 42 are heated while the units are held in mold closing relationship by the latch means.

Means are provided for supplying at least one continuous sheet 62 of plastic material. Such means can constitute any conventional apparatus for this purpose, as for example, the two-roll mill 64 shown herein. Blanking means 66 are provided for blanking plastic material from said sheet 62 of plastic material into mold cavities 42 prior to the mold closing zone. This blanking means comprises a rotary blanking cylinder 68 co-acting with mold presenting units 40, and means for passing sheet 62 between blanking cylinder 68 and mold presenting units 40 for blanking material from sheet 62 into mold cavities 42 during travel of the mold presenting units 40. Sheet material which is not blanked is removed before the mold presenting units reach the mold closing zone.

Two or more continuous sheets 62 and 62a of plastic material may be formed if desired in which case a plurality of means for making such plastic sheets (as for example a pair of two-roll mills 64 and 64a) and a plurality of blanking stations (as for example stations 66 and 66a) are provided. Where two blanking cylinders 68 and 68a are provided, the apparatus of this invention includes means for selectively moving these two blanking cylinders into and away from position for blanking material from the respective sheets 62 and 62a into mold cavities. The provision of two or more plastic sheets and blanking means makes several modes of operation possible as will be explained hereinafter in greater detail. Means are provided in each of the embodiments of this invention for removing excess plastic material which is not introduced into the mold cavities. In each case, this excess plastic material is removed after blanking and prior to the beginning of reach 26 in conveyor 20, where the mold cavities are closed. In the embodiments of FIGS. 1 and 6 and FIGS. 10 to 12, the excess material remains unblanked on plastic sheets 62, and is returned to the roll mill 64 as a part of said plastic sheet. However, in the embodiments of FIGS. 7 and 8, part of the plastic material which is blanked is introduced into the material receiving recess 44a which lies radially inwardly of the annular mold cavity 42a. In this embodiment, the means for removing excess plastic material includes the return line for plastic sheet 62 after blanking, and also includes means for removing this excess material which is introduced into this annular recess before mold cavities 42a are closed at the beginning of reach 26. This last mentioned means will be described later in detail with reference to FIG. 7. The plastic material which is so removed may be carried away on conveyor 70. Where a plurality of blanking wheels, such as 68 and 68a, is provided for the respective blanking of a plurality of plastic sheets 62, 62a, it is necessary to provide some means in conjunction with conveyor 70 for diverting the plastic material from each separate sheet to separate receptacles (not shown). This can be accomplished by means known in the art. For example, conveyor 70, or at least the discharge end thereof, may be tiltable in either direction about a longitudinal axis. A receptacle for one type of plastic material may be provided on one side of the conveyor, to receive material when said conveyor is tilted to the right, and another receptacle may be situated on the left side of the conveyor to receive plastic material from a different sheet.

Means (which will be described later in detail with reference to FIG. 10) responsive to the movement of carriers 20 are provided to release latch means 60 while mold bodies 40 and mold closing bodies 46 are maintained in mold closing position by second pressure applying means 72 located at mold opening station 30. The second pressure applying means 72 is in the form of a series of pressure rolls similar to the pressure rolls which constitute first pressure applying means 48. Rolls 72 rotate on axles 72a, which are journaled in axle housings (not shown). Rolls 72 co-act with compression track 73 located below mold closing bodies 46. After the latch means have been released, the mold presenting units 40 are separated from the mold closing units 46 at mold opening zone 30, the divergence in paths of conveyors 20 and 32 constituting the means for accomplishing this result. The machine also includes means for ejecting molded bodies from mold cavities 42 after the molds are opened and prior to the return of the mold 40 to the blanking station 66 when the mold body reaches reject station 74. The means for ejecting molded bodies will be described hereinafter with particular reference to FIGS. 7 and 8. A receptacle 75 is provided for receiving the molded articles ejected from the mold cavities.

The sheet 62 of uncured plastic material may be formed in a suitable mill, such as the two-roll mill 64 illustrated, from an unshaped mass 76 of raw plastic material. Roll mill 64 is a conventional two-roll mill having a pair of rolls 78 and 80 which rotate in opposite directions, the left hand roll rotating in a clockwise direction and the right hand roll 80 in a counterclockwise direction. The newly formed sheet 62 of plastic material is taken up on left hand roll 78, from which it passes onto endless belt conveyor 84, which passes over roll 82 at one end and over a second roll 85 at the other. After the plastic sheet 62 is separated from conveyor 84, it passes over a roll 86 and thence to blanking cylinder 68. Material is blanked from plastic sheet 62 by the protruding blanking edges 44 of the mold cavities compressed in the mold presenting units 40 as said mold presenting units pass beneath blanking cylinder 68. The residual continuous plastic sheet 62 after blanking is returned to mill 64. The sheet on the return is still continuous but is now foraminous due to the blanking of material therefrom. The return path of sheet 62 is over roll 88 and thence over endless belt conveyor 90. After the sheet leaves endless belt conveyor 90, it is returned to roll 78 in mill 64 where it is merged with unshaped plastic material 76 to again form a continuous sheet having no holes therein.

Figure 2B:
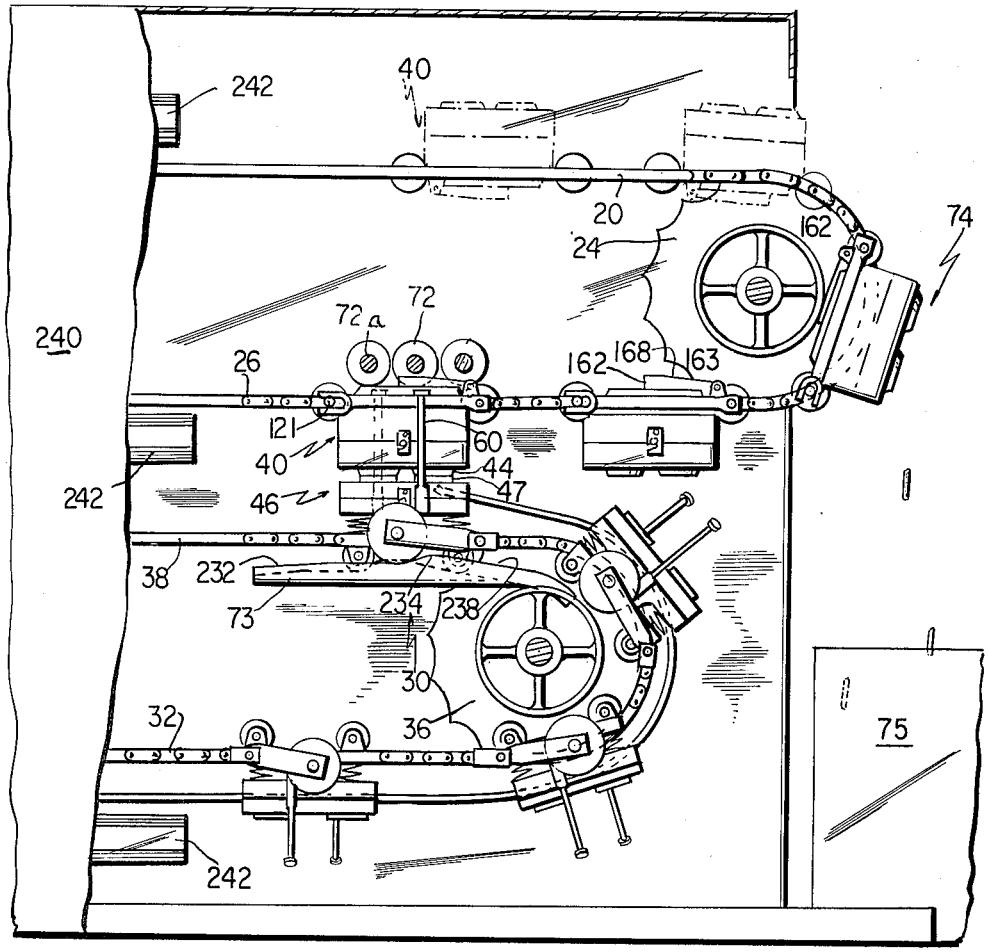
Figure 5:
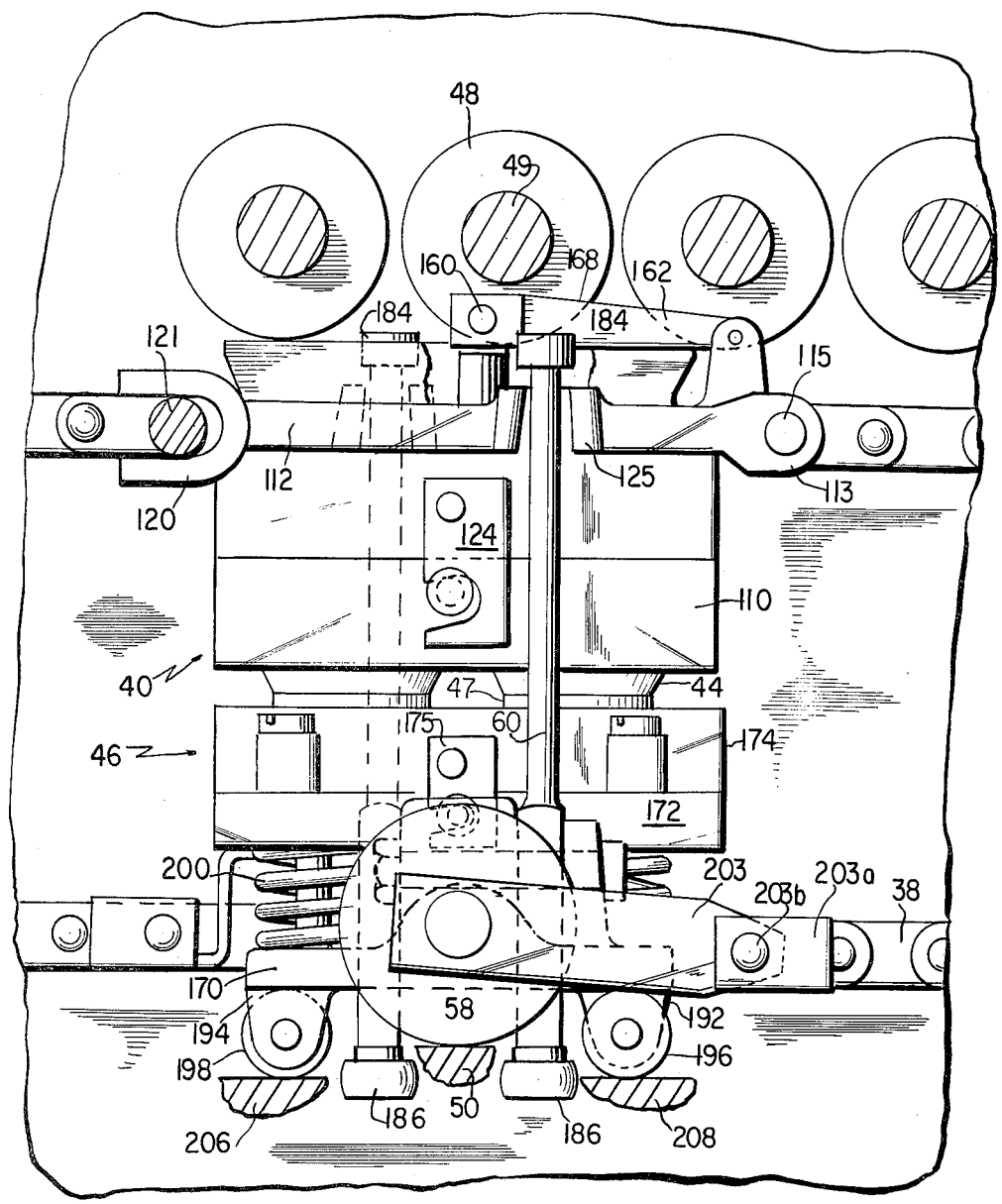
FIG. 5 is a side elevation of a mold presenting unit and mold closing unit in opposed mold closing position.

Blanking cylinder 68 and rolls 86 and 88 are mounted on a T-shaped frame member 92 which permits advancement of blanking cylinder so as to contact blanking edges 44 and retraction of said cylinder 68 from said blanking edges as shown in FIG. 2a. Roll 88 is mounted on a fixed axle about which frame 92 pivots. Movement of frame 92 can be accomplished by means of an air cylinder 94 or other suitable means.

According to a preferred embodiment of the invention, two or more blanking stations, as for example stations 66 and 66a, are provided. All of the blanking stations are substantially identical in construction. Thus at the second blanking station there is provided a second continuous sheet of plastic material 62a which is formed in rolling mill 64a having a pair of rollers 78a and 80a, an endless conveyor 84a for conveying plastic sheet material to blanking station 66a, a return conveyor 90a, and rolls 86a and 88a adjacent blanking cylinders 68a. A T-shaped frame 92a actuated by an air cylinder 94a is provided for advancing blanking cylinder 68a into contact with the blanking edges 44 of the mold cavities comprised in the mold presenting units 4 as shown in FIG. 2a and for retracting cylinder 68a. One difference in construction of the means for conveying the two plastic sheets 62 and 62a may be noted. Roll 86a constitutes one of the rolls over which conveyor 84a passes, while a separate roll 85 is provided for conveyor 84.

Endless conveyor 20 includes a pair of sprocket wheels 22 and 24 at either end of the linear reach 26 as previously noted. Tension on the conveyor is maintained by means of a conventional adjusting device 96 which bears against axle 98 of sprocket wheel 22. Tension in the second conveyor 32 is similarly maintained by means of an adjustable tensioning device 100 which bears against axle 102 of sprocket wheel 34.

Each of the mold presenting units 40 comprises a rectangular platen 110 which contains mold cavities 42. This platen is preferably square, although variations in size and shape may be made. Above this rectangular platen (when a mold presenting unit 40 is on the substantially linear reach 26 of a conveyor 20) is a cast frame member 112. Frame member 112 is a block which is preferably of approximately the same width and shape as that of platen 110. However, frame member 112 may be slightly larger in size than platen 110 if desired. Frame member 112 has a pair of lugs 113 at its forward end having transverse cylindrical bores 114 therein adapted to receive a shaft 115. Journaled on the outer ends of shaft 115 are a pair of wheels 116 which are adapted to ride guide tracks 117 which etxends through vulcanizing zone 29, starting at approximately the beginning of said vulcanization zone and terminating at approximately the end of said vulcanization zone. A pair of relatively short shaft 118 coaxial with shaft 115 extend outwardly from wheels 116. Lugs 119 bolted to shaft 118 carry spools 119a which are axially aligned with shaft 115 and 118 and extend outwardly therefrom. Spools 119a engage links in chain 20 for driving mold presenting units 40.

At the other end thereof, frame member 112 has a bifurcated lug means 120 which receives the axle 121 that supports frame 112 and at the same time permits relative movement between frame 112 and axle 121 so as to prevent binding as the frame member travels around the sprocket wheels 22 and 24. Axle 121 serves as the axle for wheels 121a, which also ride on track 117 in vulcanizing zone 29. Axle 121 is linked to conveyor chain 20 in the same manner as shaft 115, i.e., by means of a pair of short shafts 121b extending outwardly from wheels 121a, and brackets 121c secured to shaft 121b and carrying spools 121d which engage chain 20.

Frame member 112 has a pair of vertically depending side walls 122 which are welded thereto. The outer faces of wall 122 are preferably positioned so that they are flush with the outer edges of platen 112. The space enclosed by frame 112, side walls 122 and platen 110, constitutes a chamber 123. Side walls 122 are secured to plate 110 by any desired means such as latches 124 or other readily releasable means. Frame member 112 has a pair of laterally projecting two-pronged lugs 125, one on each side, to receive latch means 60. The top of frame member 112 comprises a pair of longitudinally extending runners 126 (best seen in FIGS. 3 and 6) against which compression rollers 48 and 72 bear when mold presenting members 40 are traveling beneath these respective compression means. Platens 110 are releasably mounted on mold presenting members 40 so that they may be readily changed in order to permit the molding of different products. Each platen carries one or more mold cavities of a shape corresponding to that of the article desired.

The shape and size of the mold cavity depends, of course, upon the article to be molded, e.g. door bumpers, seats, stoppers, grommets, engine mounts, heels, shoe soles, washers, O-rings, etc. When, for example, the mold body is approximately square with an area of approximately 36 square inches, the mold body will readily accommodate thirty six mold cavities about ½ inch in diameter such as a doorstop. For an O-ring about two inches in diameter the mold presenting unit will readily accommodate four annular mold cavities. However, in the detail drawings wherein a larger scale is needed for purposes of clarity, namely, FIGS. 7 and 8, only a single annular mold cavity 42a contoured for molding an O-ring has been shown presented by the mold presenting unit 40. Similarly, for closing said annular mold cavity only a single mold closing member 47a is shown presented by the mold closing unit 46.

Whenever the mold cavity is annular in shape, for the production of an annular shaped article such as an O-ring, means are provided according to this invention for ejecting the excess plastic material which is blanked and trapped in the recesses surrounded respectively by the mold cavities. According to the embodiment of the invention shown in FIGS. 7 and 8, there is shown therein a mold having an annular mold cavity 42a and a material receiving recess 131 located radially inwardly from said annular mold cavity. This mold cavity 42a is surrounded by an outer protruding blanking edge 44a and an inner protruding blanking edge 44b, which divides mold cavity 42a from material receiving recess 131. The means for ejecting excess plastic material blanked into material receiving recess 131 comprise an ejector plate 132 which is spring biased away from platen 110 by means of spring 134 which bears against said ejector plate 132 and said platen 110. Preferably a spring recess 136 is provided. Ejector plate 132 in its normal position is approximately flush with the tips of protruding blanking edges 44. A stem 138 is affixed to plate 132 and extends through block 110. A limit stop 140 at the end of stem 138 limits the outward movement of ejector plate 132. Preferably a recess 142 in communication with chamber 123 is provided for limiting stop 140. When a mold presenting member 40 passes beneath a blanking cylinder 66 in plastic material blanking position, as shown in the top of FIG. 7, plastic material is blanked both into the mold cavity 42 and into the mold receiving recess 131 and at the same time ejector plate 132 is pushed inwardly by the plastic material against the bias of spring 134. After the plastic material has been blanked, ejector plate 132 returns to its normal position at the surplus material reject station, thereby ejecting surplus plastic material which has been blanked from the continuous sheet of plastic material but which was not introduced into mold cavities 42. The ejected surplus plastic material is conveyed away on conveyor 70.

Each of the mold cavities 42a contains a movable bottom member 144 which is reciprocable within the mold cavity and which is secured to the ends of reciprocable plungers 146 that are cylindrical and extend through cylindrical bores in block 110. These bores are widened adjacent mold cavities 42a in order to provide spring recesses 148 having compression springs 150 therein. Stop plates 152 bear against the shoulders 154 of spring recesses 148. Springs 150 bias stop plate 152 against shoulder 154, so that the mold bottom members 144 normally are disposed at the base.

For ejecting molded articles after the opening of the molds, there is provided a plate 156 which is disposed for actuating each of the plungers 146. This plate is secured to the end of rod 158 which extends through cast frame member 112 in reciprocable relation and which has a pivot pin 160 adjacent one end thereof on the exterior of mold presenting unit 40. A lever 162 is secured at one end to rod 158 by the pivot pin 160 and is secured at the other end by fixed pivot 164 to a lug 166 which is an integral part of casting 112, either being cast integrally therewith or welded or otherwise fixedly secured thereto. This lever 162 has a sloping surface 168 which is adapted to be contacted by a cam operator 163 when the mold body 40 reaches the molded article ejection station 74, thereby pressing lever 162 toward frame member 112 and moving plate 156 toward block 110, which in turn pushes mold bottom members 144 outwardly, causing the ejection of the molded articles in mold cavities 42a.

Cam operator 163 is a wheel which is concentric with sprocket 24 and which has a rim adapted to bear against the sloping surface 168 of lever 162. Lever 162 extends longitudinally along the center line of frame 112, and cam operator 163 is positioned midway between two sprocket wheels 24 for coaction with said surface 168.

Each of the mold closing units 46 is of three piece construction comprising an undercarriage 170, a support block 172 and a mold closing platen 174 which comprises the mold closure members 47, which are contoured to coact with mold cavities 42 in mold presenting units 40 while the mold presenting units 40 and the mold closing units 46 travel in opposed relation along the respective linear reaches 26 and 38. Support block 172 is mounted to permit reciprocating movement within limits with respect to undercarriage 170. Mold closing platen 174 is releasably secured to support block 172 by means of latches 175. This makes it possible to change platens 174 depending on the particular articles to be molded. Thus, for example, one platen having mold closing units corresponding in shape to rubber heels may be provided, and this platen may be removed and replaced by another platen, for example one having annular mold closing units for the production of O-rings. In this way various platens having different shapes of mold cavities depending on the desired molded article may be readily secured in place and removed. Each mold closing platen 174 has guide lugs 176 which enter recesses 176a in the opposed platen 110 in mold presenting unit 40 to guide the mold presenting unit and its opposed mold closing unit into proper alignment during mold closing.

Undercarriage 170 comprises a flat bottom portion 177 and a pair of upstanding members 178 which have transversely extending bores 180 for receiving the pivot pins 182 for latch means 60. Latch means 60 comprises a pair of levers which extend upwardly when the mold bodies 40 and mold closing bodies 46 are in mold closing position. Latches 60 have knobs 184 at the extremities thereof for engaging laterally projecting lugs 125 and thereby holding the mold presenting units 40 and mold closing units 46 together in mold closing position while said units travel along the linear reaches between the mold closing station and the mold opening station. Latches 60 have at the opposite end thereof cam rollers 186 for coaction with a guide track which constitutes a part of the mold closing means and the mold opening means as will be hereinafter described.

Roller means 58 in the form of a pair of large wheels are mounted on axles 190 which are journaled in axle recesses in undercarriage 170. Wheels 58 are on either side of mold closing unit 46 at approximately the midpoint from front to rear of each of said mold closing bodies. Undercarriage 170 also has fixedly secured thereto a pair of vertically depending lugs 192, 194 at the front and the rear respectively of mold closing body 46. Rollers 196, 198 are journaled for rotation in lugs 192, 194 respectively. As may be seen in FIG. 3, rollers 196 and 198 are adapted to travel on separate tracks located side by side as will be described below in connection with FIG. 9.

Casting 172 is normally biased away from undercarriage 170 by means of heavy compression springs 200. Bolts 202 are provided for limiting the movement of casting 172 away from undercarriage 170.

A pair of drawbars 203, one on either side of mold closing unit 46, and a pair of short links 203a, link each mold closing unit to conveyor chain 32. Drawbars 203 are attached at one end to axles 190, which also are the axles for wheels 58. A lateral shaft 203b extending from one link 203a to the corresponding link on the opposite side of mold presenting units 46, joins drawbars 203 with links 203a. Spools 203c join links 203a to conveyor chain 32.

Each of the wheels 58 and each of the wheels 196 and 198 on mold closing unit 46 rides a separate track, and the tracks are so arranged to maintain each mold closing body level at all times. The tracks are best illustrated in FIG. 9. The large side wheels 58 ride on compression tracks 50 in the mold closing zone 28 as already explained. Compression track 50 has at least one and preferably a plurality of undulations comprising valleys 52 and peaks 54. In addition, compression track 50 has an upwardly sloping entry portion 204 which guides mold closing bodies 46 into mold closing relationship with the opposed mold body 40.

Figure 11:
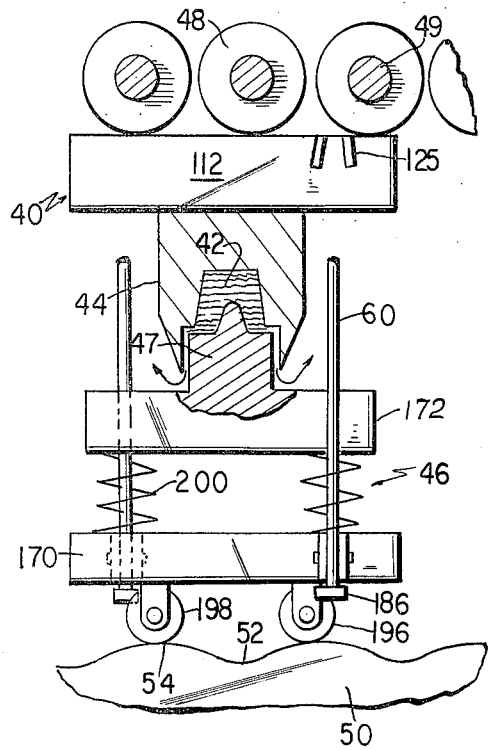
FIG. 11 is a schematic side elevation, partly in section, showing diagrammatically a mold presenting unit and mold closing unit according to a further modified form of the invention, showing particularly the mold cavity and mold closing member.
Figure 12:
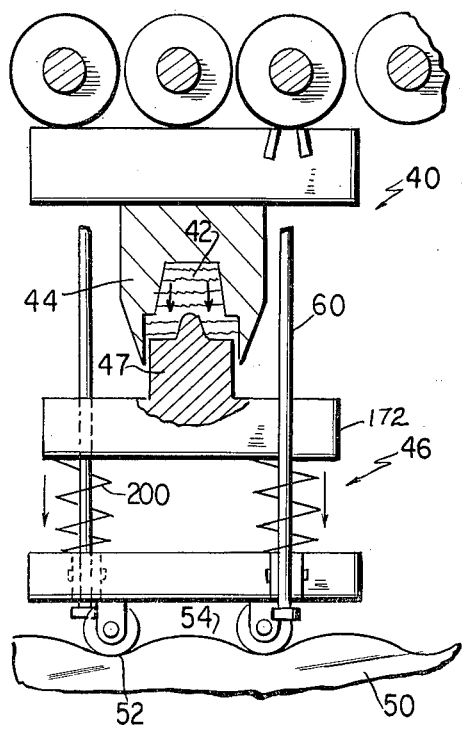
FIG. 12 is similar to FIG. 11 but shows the parts in a different relative position.
Figure 13:
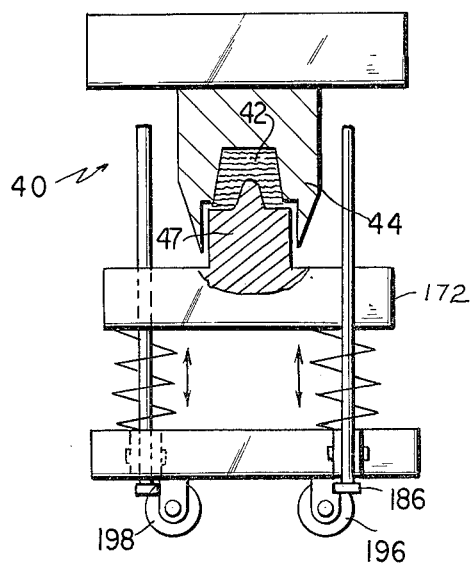
FIG. 13 is similar to FIG. 11 but shows the mold presenting and mold closing units held in mold closing relation solely by latch means which secures these units together during travel through the vulcanizing zone.

Compression tracks 50 lie directly under rollers 48. In this way the coaction between rollers 48 and compression tracks 50 compress mold presenting units 40 and opposed mold closing units 46 into mold closing relationship when the latter is moved upwardly by the first peak in compression track 52. When a mold closing unit 46 is riding in upward position over the last peak 54, the latches 60 are moved to mold closing position as will be hereinafter described, and said latches extend upwardly above latch securing lugs 125. In this position the closure of mold cavities 42 is accomplished solely by means of the coaction of rollers 48 and compression track 50, the latches 60 playing no part in the closure of the mold at this time. As a mold presenting unit 40 and its opposed mold closing unit 46 ride slightly farther, the mold closing unit 40 drops into valley 52 in compression track 50, and the mold cavity 42 is opened slightly to permit the expulsion of air which may be entrapped therein. This is best illustrated in FIGS. 11 and 12. FIG. 11 shows the mold presenting unit 40 and opposed mold closing unit diagrammatically as they ride over peak 54 in track 50, while FIG. 12 shows the same units as mold closing unit 46 rides through a valley 52 in track 50. Latches 60 are in the open position while mold closing unit 46 rides through the mold closing zone, until the mold closing unit rides over the last peak 54 in the mold closing zone. At that time the latches are moved to closed position. It is very desirable to provide several peaks and valleys in compression track 50 so that the mold cavities 52 will be opened and closed several times, thereby assuring that all air entrapped therein will be expelled. As a mold presenting unit 40 and an opposed mold closing unit 46 ride from the mold closing zone 28 to the vulcanizing zone 29, the mold closure members 46 ride through a valley 52 at the very end of track 50, and thence off the track 50. From this point throughout the length of the vulcanizing zone 29, the mold closing unit 46 is secured to its opposed mold presenting unit 40 solely by means of latches 60. The latches 60 retain the opposed mold presenting unit 40 and mold closing unit 46 in mold closing position.

Small wheels 196 and 198 at the front and rear of undercharriage 170 respectively are laterally offset by a short distance and ride on tracks 206 and 208 respectively. The undulations in tracks 206 and 208 correspond exactly to the undulations in track 50, but are offset by a distance in the direction of travel equal to the longitudinal distance between side wheels 58 on the one hand and front and rear wheels 196 and 198 on the other. Thus the up-sloping entry portion 210 of track 206 is located forward of the corresponding portion 204 of track 50 by a distance equal to the distance measured in the direction of travel between wheels 58 and wheels 196. Similarly, entry portion 212 of track 208 is set back from the corresponding entry portions 204 of track 50. The peaks 214 and 216 and valleys 218 and 220 in tracks 206 and 208 respectively are likewise longitudinally displaced from the corresponding peaks and valleys 54 and 52 respectively in track 50. In this way each mold body travels up and down over the undulations in the guide tracks, and yet remains in a level position at all times.

As shown in FIG. 9, cam tracks 222 are provided in the mold closing station 28 in order to move latches 60 from an open to a closed or mold securing position. To this end, each of the tracks 222 has a groove 224 extending longitudinally therethrough. Cam rollers 186 of latches 60 ride through grooves 224 as the mold presenting units 40 and the mold closing units 46 pass through mold closing zone 28. Grooves 224 have entry segments 226 located close to the respective innner walls of cam tracks 222a followed by outwardly directed oblique segments 228, followed by segments 230 which are parallel to the direction of travel and located close to the respective outer walls of cam track 222. While the cam rollers 186 are in the entry segments 226, the latches 60 are in open position. The oblique segments 228 cause the closure of the molds as a result of directing the latches 60 inwardly so that the knobs 184 thereon engage the laterally projecting members 125 on mold bodies 40. Segments 228 are located near the exit end of track 222 so that the latches 60 are closed as the mold closing unit rides over the last peak 54 in the mold closing zone 28.

Figure 10:
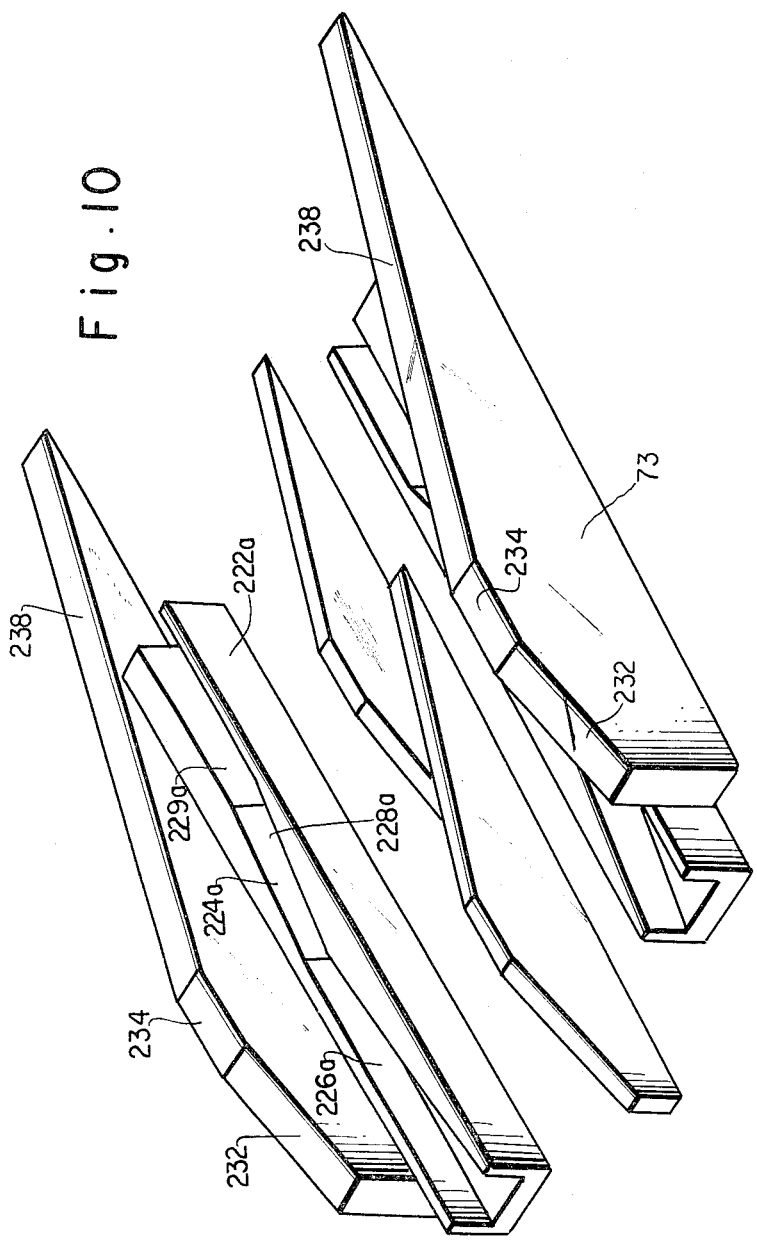
FIG. 10 is an isometric and partly schematic view of the guide tracks at the mold opening station.

At mold opening station 30 there is a second pair of cam tracks 222a, as shown in FIG. 10, for moving latches 60 to mold opening position. Each of the cam tracks 222a has a groove 224a extending longitudinally therethrough in which roller bearings 186 on latches 60 ride. Each groove 224a has an entry segment 226a which is wide at the entry end and which narrows down to a narrow passageway, slightly wider than bearing 186, adajacent the outer walls of tracks 222a. Following the entry segments 226a are oblique inwardly directed segments 228a, which direct latches 60 outwardly to mold opening position.

To assist in mold opening, there is provided a pair of compression tracks 73 in mold opening station 30. This pair of compression tracks has an up-sloping entry portion 232 followed by one peak 234 and a down-sloping exit portion 238. The compression track 73 is positioned directly below compression rollers 72 so as to coact therewith. The coaction of rollers 72 and track 73 presses the opposed mold presenting units 40 and mold closing units 46 together so that the latch members 60 may be free to swing outwardly and permit opening of the molds. The peak 234 in compression track 73 is positioned so that the wheels 58 in the mold closing unit 46 will be riding the peak 234 at the time the roller bearing on latches 60 enter the mold opening segment 228a in track 222a.

The curing or vulcanizing zone indicated generally at 29 includes a refractory lined housing 240 which encases both the vulcanizing zone 29 itself and the return portions of conveyors 20 and 32 located thereabove and therebelow respectively. Heat lamps 242, which are preferably conventional infrared lamps, impart the necessary heat for curing. These heat lamps are mounted on posts 244 which are all of the same height and spaced at intervals along the direction of travel of mold bodies 40. Heat lamps 242 are also mounted along the return reaches of conveyors 20 and 32, so as to keep the mold presenting units 40 and mold closing units 46 warm as they return for the beginning of a new cycle. Heat losses and consequently variations in temperature are much less in mold presenting units 40 than in conventional molds controlled by hydraulic presses. The mold presenting units 40 are warm enough at the time of blanking plastic material into mold cavities 42 therein so that the plastic material flows and fills up the mold cavities. The mold presenting units and mold closing units are still warm when they enter the vulcanizing zone, shortening the length of time necessary for vulcanization and providing much better temperature and quality control than in conventional molding.

Guide tracks 117 for wheels 116 journaled from member 112 so as to carry the mold presenting and mold closing units when latched together commence at the beginning of the vulcanizing zone and terminate at the end of the vulcanizing zone, so that they do not extend into either mold closing zone 28 or mold opening zone 30. It will be noted that no compression track is provided in the vulcanizing zone 29 and that mold closing units 46 are secured to mold presenting units 40 in mold closing position solely by the closure of latches 60. The mold closing units 40 are under compression only in mold closing zone 28, which is the coolest portion of the operating cycle. The apparatus is under compressive stress only when relatively cool and therefore best able to withstand such stress. This results in much less wear on parts such as compression tracks and wheels. A guide track 252 is provided for wheels 116 in the return reach of conveyor 20. This track supports mold presenting units 40 in the blanking zone. Mold closing units 46 travel in the return reach on guide tracks 254 which receive rollers 58.

The operation of the machine of this invention will now be described. Uncured plastic material is blanked from a continuous plastic sheet 62 in blanking zone 66, and is introduced into mold cavities 42. As already pointed out, more than one continuous sheet of plastic material can be provided, and in the specific embodiment illustrated there are two such plastic sheets 62 and 62a. When more than one plastic sheet is provided, the process can be operated in various ways. For example, two or more different articles can be produced simultaneously in different mold bodies. In such a mode of operation, one set of mold cavities 42 can receive material from one plastic sheet 62 while another set of mold cavities receive material from the other plastic sheet 62a. For example, two separate articles made from different rubber or plastic stocks, such as O-rings in one-half of the mold bodies and rubber washers in the other half, can be made in a single run. Furthermore, composite rubber and plastic articles can be made. Thus rubber heels comprising a tough well-wearing rubber stock can be provided along the outside surface of the heel, backed by a relatively cheaper and less well-wearing rubber stock for contact with the shoe. This is accomplished by blanking material from one plastic sheet 62 (which in this case contains the tough well-wearing rubber stock) followed by blanking of material from the other blanking sheet 62a (which in this case contains the relatively cheaper and less well-wearing rubber stock) into the same mold cavities.

If the mold cavity is of the type which surrounds a material receiving recess in which excess blanked out material is retained, this excess blanked out material can be conserved by removal prior to vulcanization in the material reject station from which the excess material is removed by the carrier 70. The mold cavities 42 are then closed in mold closing station 28.

The linear reach of conveyor 20 extends beyond the linear reach of conveyor 32. This is desirable so that articles which are ejected at the molded body ejection station 74 can fall vertically into receptacle 75 without becoming entangled in conveyor 32. Likewise conveyor 32 extends forwardly in advance of conveyor 20. This permits the mold closing members to come into upturned horizontal position unobstructed by the carrier 20. When in this position feeding of inserts onto the mold closing members 47 is facilitated, if it is desired to have an insert within the mold cavity when the mold becomes closed immediately thereafter.

As a mold cavity is closed, air or gas is frequently entrapped therein. This would result in undesirable bubbles or surface defects if such air is not bled out before the mold body enters the curing zone. In order to remove this entrapped air, each mold cavity is opened at least once and then re-closed in mold closing zone 28. This is accomplished by means of bumping track 50. As mold closing unit 46 rides upwardly on the first peak 54 of track 50, the mold closing unit 46 is compressed into mold closing relationship against mold presenting unit 40. This can best be seen in FIG. 11. The mold cavity 42 is closed and excess plastic material as well as air entrapped therein is forced outwardly. Next mold closing unit 46 rides downwardly into valleys 52 as shown diagrammatically in FIG. 12. This lessens the compression on compression springs 200. The combined force exerted by the weight of casting 172 and the compressed plastic material and air in mold cavity 42 urge casting 172 downwardly until springs 200 are again compressed which results in momentarily opening mold cavity 42. When the mold closing unit 46 again rides upwardly on the next succeeding peak in compression track 50, springs 200 are compressed and this moves casting 172 and 174 and mold closure member upwardly again forcing out trapped air. Preferably this process of alternately opening and re-closing the mold cavity 42 is repeated several times in order to insure that no air is entrapped in the mold cavity. Latches 60 are closed, securing the mold presenting unit 40 and opposed mold closing unit 46 together as the mold closing unit 46 rides over the last peak 54.

The mold presenting units then travel through the curing or vulcanizing zone 29 wherein the mold presenting units 40 and the plastic material contained therein are held under pressure and heated to a temperature and for a time appropriate for the particular plastic material being vulcanized or cured. Expansion of the plastic material upon heating in the vulcanization zone places the plastic under pressure. Pressure is also supplied by compression in the mold closing zone 28. The curing or vulcanizing temperature varies somewhat depending upon the particular material being vulcanized. Proper curing or vulcanizing temperatures and times for rubber and various synthetic thermoplastic materials are well known in the art, and it is contemplated that these materials will be heated to such temperatures and for such time in using the apparatus of this invention. For example, natural rubber compounded with a suitable filler and a vulcanizing curative such as sulfur, zinc oxide, or the like, may be vulcanized at a temperature of about 350° to 400° F. for a period of about one minute. Certain thermoplastic materials, as for example, vinyl chloride, or copolymers of vinyl chloride with vinylide chloride, vinyl acetate, and other comonomers which are known in the art may require a slightly lower curing temperature, for example, in the order of about 320° to 365° F. It will be appreciated that any of the moldable plastic materials which have been previously molded in conventional molding presses can also be molded in the machine of the present invention, and that the curing temperatures in both cases may be the same. Vulcanization can be carried out in less time using the present apparatus, because molds herein are more efficient and do not lose their heat as do conventional molds, which lose their heat to the atmosphere during the time taken for hand loading. Conventional molds must be reheated and longer vulcanization time is required.

The curing time can be lengthened or shortened by reducing or increasing the speed of mold presenting units 40. Temperature is controlled by control of current flow to the heating lamps, or by insertion or removal of lamps.

After the plastic material has been cured or vulcanized, the finished molded product is discharged. First of all, the mold presenting units 40 pass through a mold opening station 30, wherein said mold presenting units 40 are separated from the opposed mold closing units 46. The molded bodies are then discharged by the mechanism already described when the molded bodies reach discharge station 74. Whenever two or more different types of molded bodies are molded simultaneously, a separate receptacle 75 should be provided for each. In this case, it is desirable not to have the molded bodies fall vertically from discharge station 74 to receptacle 75, but rather to travel between discharge station 74 and receptacle 75 on a suitable conveyor, for instance one similar to conveyor 70. In this case, such conveyor should have means for directing the articles conveyed therealong to the desired receptacle.

After discharge, the mold presenting unit 40 returns on the return reach of conveyor 20 and mold closing units 46 return on the return reach of conveyor 32. Toward the end of the return reach, shortly before mold presenting unit 40 passes around sprocket wheel 22, fresh uncured plastic material is blanked into the mold cavities 42 at blanking station 66, and a new cycle is begun.

While we have described the foregoing invention with respect to specific embodiments thereof, it is to be understood that this invention can be construed only by the claims.

What is claimed is:

1. A machine for making molded bodies from plastic material which comprises in combination a first endless carrier having at least one elongated linear reach extending from a mold closing zone adjacent one end to a mold opening zone adjacent the other end, a second endless carrier having at least one elongated linear reach extending from said mold closing zone to said mold opening zone, means for driving said carriers at the same speed and in the same direction along said reaches, a succession of mold presenting units secured to said first carrier for travel therewith each of which has a mold cavity therein, a succession of mold closing units secured to said second carrier for travel therewith each having a mold closing member adapted to coact with a mold cavity when held thereagainst during travel thereof along said reaches and thereby close same, pressure applying means at said mold closing zone for pressing said mold closing units resiliently against said mold units in closed relation with respect to said mold cavities during and responsive to travel of said first and second carriers through said zone, means for supplying a continuous sheet of plastic material, blanking means for blanking plastic material from said sheet into said mold cavities during travel of said mold units prior to said mold closing zone, means for removing sheet material not blanked from said sheet by said blanking means, means responsive to continued travel of said units for separting said mold closing units from said mold presenting units to open said mold cavities at said mold opening zone, and means responsive to travel of said mold presenting units with said first carrier for ejecting molded bodies from said mold cavities after the opening of said molds and prior to the aforesaid blanking means; said machine comprising means adjacent said mold closing zone for at least once reopening said mold cavities sufficiently to permit escape of entrapped gas and for reclosing said mold cavities with said mold closing means while said mold presenting units are resiliently urged towards said mold closing units in said pressure applying means, said means comprising fixed track means comprised in said pressure applying means that present an undulating surface, and roller means secured to each unit in at least one of said successions of units which coacts with said undulating surface to reopen said mold cavity during and responsive to travel of said roller means through a valley in said undulating surface and to then promptly reclose said cavity as said roller means approaches the trailing end of said valley.

2. A machine for making molded bodies from plastic material which comprises in combination a first endless carrier having at least one elongated substantially linear reach, a succession of mold presenting units carried by said carrier, each having at least one mold cavity therein, a second endless carrier having an elongated substantially linear reach in opposed relation to the reach of said first carrier, a succession of mold closing units carried by said second carrier, said mold closing units being in opposed alignment with the mold presenting units carried by said first carrier, each of said mold closing units having a closure member adapted to coact with the mold cavity in the opposed mold presenting unit to close the same when said units are brought into opposed relation during travel along said reaches pressure applying means at the beginning of said reach and at the end of said reach for pressing said mold closing units resiliently against said mold presenting units in closed relation with respect to said mold cavities during and responsive to travel of said first and second carriers in said reach, means for driving said first and second carriers for synchronized travel of said mold presenting units and mold closing units, cooperating latch and latch-engaging means for securing said mold bodies to the mold closing units opposed thereto in mold closing relationship when said units are traveling along the respective opposed linear reaches of said first and second endless carriers, first guide means actuatable for moving said latch means to mold securing position responsive to movement of said units along said reach while said mold closing units are pressed resiliently against said mold presenting units by said pressure applying means at the beginning of said reach, second guide means actuatable for moving said latch means to release position responsive to movement of said units along said reach while said mold closing units are pressed resiliently against said mold presenting units by said pressure applying means at the end of said reach, means combined in said pressure applying means adjacent the beginning of said reach; providing for travel of said mold closing units in an undulating path at the beginning of said reach into, away from and then return to mold-closing relation with respect to said mold presenting units responsive to travel of said mold closing units, means for heating said units and the plastic material contained in said mold cavities while said units are traveling in mold-closing relationship in said reach, means for blanking plastic material from a continuous plastic sheet into said mold cavities prior to said reach, means for removing excess plastic material after said means for blanking and prior to the beginning of said reach, and means for discharging molded bodies at the end of said reach.

3. A machine for making molded bodies from plastic material which comprises in combination a first endless carrier having at least one elongated substantially linear reach, a succession of mold presenting units carried by said carrier, each having at least one mold cavity therein, a second endless carrier having an elongated substantially linear reach in opposed relation to the reach of said first carrier, a succession of mold closing units carried by said second carrier, each of said mold closing units having a mold closing member adapted to coact with a mold cavity to close the same when said units are brought into opposed relation during travel along said reaches, means for driving said first and second carriers at the same speed in the same direction along said reaches, means for maintaining said mold presenting units and said mold closing units in mold closing relationship while said units are traveling along the respective opposed linear reaches of said first and second endless carriers, means for heating said units and the plastic material contained in said mold cavities while said units are traveling in mold closing relationship along said reaches, a plurality of means for respectively supplying a continuous sheet of uncured and unblanked plastic material, blanking means for blanking plastic material from said sheets of plastic material respectively into said mold presenting units at successive points of travel of said mold presenting units in advance of said maintaining means, said blanking means comprising a blanking wheel adapted to coact with each of said supplying means respectively for receiving therefrom and providing a backing surface for the respective uncured plastic sheets while material is blanked therefrom, means for placing each said blanking wheel and the plastic sheet material traveling therewith in blanking relationship with a mold presenting body, means for retracting each said blanking wheel from said blanking relationship, and means for discharging molded bodies at the end of said reach.

4. A machine for making molded bodies from plastic material which comprises in combination a first endless carrier having at least one elongated substantially linear reach, a succession of mold presenting units carried by said carrier, each having at least one mold cavity therein, a second endless carrier having an elongated substantially linear reach in opposed relation to the reach of said first carrier, a succession of mold closing units carried by said second carrier, each of said mold closing units having a mold closing member adapted to coact with a mold cavity to close the same when said units are brought into opposed relation during travel along said reaches, means for driving said first and second carriers at the same speed in the same direction along said reaches, means for securing a mold closing unit to a mold presenting unit in mold closing relationship while said units are traveling along the respective opposed linear reaches of said first and second endless carriers, means for heating said units and the plastic material contained in said mold cavities while said units are traveling in mold closing relationship in said reach, a plurality of endless carriers each adapted to support an uncured and unblanked plastic sheet, a blanking wheel adapted to coact with each of said endless carriers respectively for supporting the respective uncured plastic sheets while material is blanked therefrom, means for selectively placing each said blanking wheel and the plastic sheet material traveling theron in blanking relationship with a mold presenting unit for blanking plastic material from said sheet into a mold cavity in said mold presenting unit during travel thereof prior to said reaches, means for selectively retracting each said blanking wheel from said blanking relationship, and means for discharging molded bodies at the end of said reach.

5. A machine according to claim 9 wherein said mold cavity is in the form of an annular trough adapted to mold a ring-shaped body.

6. In a machine for making molded bodies from plastic material which comprises a first endless carrier having at least one elongated linear reach extending from a mold closing zone adjacent one end to a mold opening zone adjacent the other end, a succession of mold presenting units carried by said first carrier, each of said mold presenting units having at least one mold cavity therein, a second endless carrier having at least one elongated linear reach extending from said mold closing zone to said mold opening zone, a succession of mold closing units carried by said second carrier, each of said mold closing units having a mold closing member adapted to coact with a mold cavity to close the same when said units are brought into opposed relation during travel along said reaches, the elongated reach of said first endless carrier being in opposed relation with respect to said elongated reach of said second carrier, means for driving said carriers at the same rate of travel and in the same direction along said reaches thereof from said mold closing zone to said mold opening zone, means for supplying a continuous sheet of plastic material, blanking means for blanking plastic material from said sheet into said mold cavities during travel of said mold presenting units prior to said mold closing zone, means for removing sheet material not blanked from said sheet by said blanking means, means responsive to travel of said units for separating said mold closing units from said mold presenting units to open said mold cavities at said mold opening zone, and means responsive to travel of said mold presenting units with said first carrier for ejecting molded bodies from said mold cavities after the opening of said molds and prior to the aforesaid blanking means; said machine being constructed with said elongated reaches of said carriers in offset relation with the end of said reach of said second carrier adjacent said mold closing zone extending substantially beyond the end of the reach of said first carrier and with the end of said reach of said first carrier adjacent aid mold opening zone extending by a corresponding substantial amount beyond the end of said reach of said second carrier.

7. A machine according to claim 6 wherein said mold closing members face upwardly during a substantial period of travel before becoming underneath the longitudinal linear reach of said first carrier.

8. In a machine for making molded bodies having an upper endless carrier with a succession of mold presenting units secured thereon, a lower endless carrier with a succession of mold closing units secured thereon each of said carriers being mounted for orbital travel in a common vertical plane, first pressure applying means for pressing said mold presenting units resiliently against said mold closing units during and responsive to travel of said carriers, means for supplying a plurality of sheets of plastic material, blanking means for blanking plastic material from said sheets of plastic material respectively into said mold presenting units at successive points of orbital travel of said mold presenting units in advance of said first pressure applying means, means for removing sheet material not blanked from each of said plurality of sheets respectively, means permitting removal of entrapped gases from said mold presenting units before vulcanization, said removal means comprising stationary track means comprised in said first pressure applying means and having undulating roller receiving surfaces and roller means secured to each of said mold closing units and adapted to roll on said undulating surfaces in response to travel of said carriers for momentary relief at each valley of pressure applied by said first pressure applying means, means responsive to travel of said carriers for securing said mold presenting units to said mold closing units while said mold presenting units are pressed against said mold closing units by said first pressure applying means, means for heating said units during travel thereof while said units are held in mold closing relationship under pressure by said securing means, second pressure applying means spaced from said first pressure applying means for pressuring said mold closing units resiliently against said mold presenting units during and responsive to movement of said carriers, and means for releasing said securing means from said mold presenting units during and responsive to movement of said carriers while said mold presenting units are pressed against said mold closing units by said second pressure applying means.

9. A machine for making molded bodies from plastic material which comprises in combination a first endless carried having at least one elongated linear reach extending from a mold closing zone adjacent one end to a mold opening zone adjacent the other end, a second endless carrier having at least one elongated linear reach extending from said mold closing zone to said mold opening zone, means for driving said carriers at the same speed and in the same direction along said reaches, a succession of mold presenting units secured to said first carrier for travel therewith each of which has a mold cavity therein, a succession of mold closing units secured to said second carrier for travel therewith each having a mold closing member adapted to coact with a mold cavity when held thereagainst during travel thereof along said reaches and thereby close same, pressure applying means adjacent said mold closing zone and adjacent said mold opening zone for pressing said mold closing units resiliently against said mold presenting units in closed relation with respect to said mold cavities during and responsive to travel of said first and second carriers through each of said zones, means for supplying a continuous sheet of plastic material, blanking means for blanking plastic material from said sheet into said mold cavities during travel of said mold units prior to said mold closing zone, means for removing sheet material not blanked from said sheet by said blanking means, means responsive to continued travel of said units for separating said mold closing units from said mold presenting units to open said mold cavities at said mold opening zone, and means responsive to travel of said mold presenting units with said first carrier for ejecting molded bodies from said mold cavities after the opening of said molds and prior to the aforesaid blanking means; said machine comprising latch means carried by said mold closing units for securing a mold closing unit to a mold presenting unit after said units have been brought into mold closing relationship and for maintaining said units in mold closing relationship while said units are traveling along the respective opposed linear reaches of said first and second endless carriers, means for actuating said latch means responsive to travel of said units along said reaches to secure said units together while said units are resiliently pressed together by said pressure applying means adjacent said mold opening zone and means for actuating said latch means responsive to travel of said units along said reaches to release said latch means while said units are resiliently pressed together by said pressure applying means adjacent said mold opening zone.

10. A machine for making molded bodies from plastic material which comprises in combination a first endless carrier having at least one elongated linear reach extending from a mold closing zone adjacent one end to a mold opening zone adjacent the other end, a second endless carrier having at least one elongated linear reach extending from said mold closing zone to said mold opening zone, means for driving said carriers at the same speed and in the same direction along said reaches, a succession of mold presenting units secured to said first carrier for travel therewith each of which has a mold cavity therein, a succession of mold closing units secured to said second carrier for travel therewith each having a mold closing member adapted to coact with a mold cavity when held thereagainst during travel thereof along said reaches and thereby close same, pressure applying means at said mold closing zone for pressing said mold closing units resiliently against said mold presenting units in closed relation with respect to said mold cavities during and responsive to travel of said first and second carriers through said zone, means for supplying a continuous sheet of plastic material, blanking means for blanking plastic material from said sheet into said mold cavities during travel of said mold units prior to said mold closing zone, means for removing sheet material not blanked from said sheet by said blanking means, means responsive to continued travel of said units for separating said mold closing units from said mold presenting units to open said mold cavities at said mold opening zone, and means responsive to travel of said mold presenting units with said first carrier for ejecting molded bodies from said mold cavities after the opening of said molds and prior to the aforesaid blanking means; said machine comprising a track comprised in said pressure applying means having a plurality of bumps therein for momentarily separating said mold closing units with respect to said mold presenting units while said mold presenting units are resiliently urged towards said mold closing units responsive to travel of said units adjacent the beginning of said opposed linear reaches and thereby opening said mold cavities after initial closure thereof for releasing gas entrained therein.

11. A machine for making molded bodies from plastic material which comprises in combination a first endless carrier having at least one elongated linear reach extending from a mold closing zone adjacent one end to a mold opening zone adjacent the other end, a second endless carrier having at least one elongated linear reach extending from said mold closing zone to said mold opening zone, means for driving said carriers at the same speed and in the same direction along said reaches, a succession of mold presenting units secured to said first carrier for travel therewith each of which has a mold cavity therein, a succession of mold closing units secured to said second carrier for travel therewith each having a mold closing member adapted to coact with a mold cavity in opposed relation therewith when held thereagainst during travel thereof along said reaches and thereby close same, means for supplying a continuous sheet of plastic material, blanking means for blanking plastic material from said sheet into said mold cavities during travel of said mold units prior to said mold closing zone, means for removing sheet material not blanked from said sheet by said blanking means, means responsive to continued travel of said units for separating said mold closing units from said mold presenting units to open said mold cavities at said mold opening zone, and means responsive to travel of said mold presenting units with said first carrier for ejecting molded bodies from said mold cavities after the opening of said molds and prior to the aforesaid blanking means; said machine comprising compressible resilient means in each mold unit of one of said successions of mold units, latch means for detachably securing each mold closing unit to a mold presenting unit, said latch means cooperating with said resilient means for resiliently maintaining said mold closing unit in compressive pressure contact with said mold presenting unit during travel thereof along said reaches, first pressure applying means adjacent said mold closing zone for compressing said resilient means to press said mold closing unit resiliently against said mold presenting unit responsive to travel of said carrier through said zone, means for actuating said latch means to latching positions responsive to travel of said carriers through said zone while said mold closing unit is resiliently pressed against said mold presenting unit by said first pressure applying means and second pressure applying means adjacent said mold opening zone in spaced relationship with respect to said first pressure applying means for compressing said resilient means to press said mold closing unit against said mold presenting unit responsive to travel of said carriers through said mold opening zone and means for actuating said latch means to release positions responsive to travel of said carriers through said mold opening zone while said mold closing unit is resiliently pressed against said mold presenting unit by said second pressure applying means.

References Cited by the Examiner

UNITED STATES PATENTS

| | | |
|---|---|---|
| 1,525,629 | 2/1925 | Thompson. |
| 1,750,708 | 3/1930 | Edwards _____ 18—4 X |
| 1,958,422 | 5/1934 | Dinzl _____ 18—4 |
| 1,965,732 | 7/1934 | Bisterfeld _____ 18—20 |
| 2,027,165 | 1/1936 | Grubman _____ 18—4 |
| 2,103,860 | 12/1937 | Mazzeo _____ 18—4 |
| 2,593,667 | 4/1952 | Gora. |
| 2,657,426 | 11/1953 | Gora. |
| 2,912,717 | 11/1959 | Yarrison et al. _____ 18—4 |
| 2,958,095 | 11/1960 | Ahlefeld et al. _____ 18—4 |

WILLIAM J. STEPHENSON, *Primary Examiner.*